(12) United States Patent
Sano

(10) Patent No.: US 10,307,681 B2
(45) Date of Patent: Jun. 4, 2019

(54) SERVER DEVICE, CONTROL METHOD PERFORMED BY THE SERVER DEVICE, PROGRAM, AND TERMINAL DEVICE

(71) Applicant: GREE, INC., Tokyo (JP)

(72) Inventor: Takayuki Sano, Tokyo (JP)

(73) Assignee: GREE, INC., Tokyo (JP)

( * ) Notice: Subject to any disclaimer, the term of this patent is extended or adjusted under 35 U.S.C. 154(b) by 212 days.

(21) Appl. No.: 14/228,162

(22) Filed: Mar. 27, 2014

(65) Prior Publication Data

US 2014/0295933 A1    Oct. 2, 2014

(30) Foreign Application Priority Data

Mar. 28, 2013  (JP) .................................. 2013-070196

(51) Int. Cl.
*A63F 13/69*     (2014.01)
*G07F 17/32*    (2006.01)

(52) U.S. Cl.
CPC ............ *A63F 13/69* (2014.09); *G07F 17/326* (2013.01); *G07F 17/329* (2013.01); *G07F 17/3244* (2013.01); *G07F 17/3255* (2013.01); *G07F 17/3267* (2013.01); *A63F 2300/308* (2013.01); *A63F 2300/558* (2013.01); *A63F 2300/609* (2013.01); *A63F 2300/63* (2013.01)

(58) Field of Classification Search
None
See application file for complete search history.

(56) References Cited

U.S. PATENT DOCUMENTS

| 2002/0006819 | A1* | 1/2002 | Kubo et al. ..................... 463/11 |
| 2006/0079311 | A1* | 4/2006 | Nulph ............................ 463/17 |
| 2007/0032287 | A1* | 2/2007 | Osawa .................... G07F 17/32 |
| | | | 463/16 |
| 2008/0248869 | A1* | 10/2008 | Umezaki ................. A63F 13/10 |
| | | | 463/31 |
| 2009/0117989 | A1* | 5/2009 | Arezina et al. ................. 463/20 |
| 2009/0227314 | A1* | 9/2009 | Bennett .......................... 463/16 |

(Continued)

FOREIGN PATENT DOCUMENTS

| JP | 2008-220984 A | 9/2008 |
| JP | 2010-051400 A | 3/2010 |

(Continued)

OTHER PUBLICATIONS

Office Action issued in related Japanese patent application JP 2014-229083 with English translation, dated May 26, 2015, 6 pages.

(Continued)

*Primary Examiner* — Jason T Yen
(74) *Attorney, Agent, or Firm* — Maier & Maier, PLLC

(57) ABSTRACT

An item can be provided to a user by a lottery and the item odds can be changed in accordance with a prescribed condition. A control method, performed by a server device connected via a communication line to a terminal device operated by a user, comprises the step of selecting a lottery mode from among a plurality of lottery modes, the step of following the selection of the lottery mode, holding a drawing from among a plurality of types of items on the basis of the selected lottery mode, and the step of following the holding of the drawing, providing the won item to the terminal device.

20 Claims, 10 Drawing Sheets

(56) References Cited

U.S. PATENT DOCUMENTS

2012/0108309 A1* 5/2012 Aoki et al. .................. 463/13
2012/0264505 A1* 10/2012 Anderson et al. ............ 463/25
2014/0073416 A1   3/2014 Toyama

FOREIGN PATENT DOCUMENTS

| JP | 2010-240222 A | 10/2010 |
| JP | 2012-235871 A | 12/2012 |
| JP | 2013-022320 A | 2/2013 |
| JP | 2013-070196   | 4/2013 |

OTHER PUBLICATIONS

Office Action issued in related Japanese patent application JP 2015-131567 with English translation, dated May 24, 2016, 7 pages.
Office Action issued in related Japanese patent application JP 2015-131567 with English translation, dated Jan. 19, 2016, 4 pages.
Office Action issued in related Japanese patent application JP 2016-210560 with English translation, dated May 23, 2017, 3 pages.
Office Action issued in related Japanese patent application JP 2016-210560 with English translation, dated Feb. 7, 2017, 10 pages.

\* cited by examiner

FIG. 3

| ITEM IDENTIFIER | ITEM NAME | TIMING OF ADDITION | PARAMETERS ||||| 
|---|---|---|---|---|---|---|---|
| | | | ATTRIBUTE | HP | ATTACK POWER | DEFENSE POWER | RARITY |
| ID00001 | Xxxxxx | 2013/03/22 | WATER | 300 | 150 | 120 | SS |
| ⋮ | ⋮ | ⋮ | ⋮ | ⋮ | ⋮ | ⋮ | ⋮ |

FIG. 4

| USER ID | PASSWORD | HISTORY INFORMATION ||||| MODE SELECTION PROBABILITIES |||||
|---|---|---|---|---|---|---|---|---|---|---|
| | | Lv | STATUS | PLAYING TIME | ACQUIRED ITEMS | MODE INFORMATION | MID 001 | MID 002 | MID 003 | ... |
| UID001 | Yr98AB77 | 45 | LOGGED IN | 156:45:16 | ID0003, ID0006 | ... | 50% | 30% | 15% | ... |
| ⋮ | ⋮ | ⋮ | ⋮ | ⋮ | ⋮ | ⋮ | ⋮ | ⋮ | ⋮ | ⋮ |

FIG. 5

| MODE IDENTIFIER | MODE NAME | ITEM ODDS | | | |
|---|---|---|---|---|---|
| | | ID001 | ID002 | ID003 | |
| MID001 | NON-DUPLICATE MODE | 20% | 40% | 30% | ... |
| MID002 | WATER ATTRIBUTE GUARANTEE MODE | 60% | 0% | 0% | ... |
| MID003 | FIRE ATTRIBUTE GUARANTEE MODE | 0% | 50% | 0% | ... |
| MID004 | THUNDER ATTRIBUTE GUARANTEE MODE | 0% | 0% | 70% | ... |
| MID005 | XXX OR GREATER ATTACK POWER GUARANTEE MODE | 20% | 0% | 70% | ... |
| MID006 | XXX OR GREATER DEFENSE POWER GUARANTEE MODE | 0% | 50% | 50% | ... |
| MID007 | SKILL-ATTACHED ITEM GUARANTEE MODE | 0% | 0% | 70% | ... |
| MID008 | EVENT ITEM ENRICHED MODE | 0% | 60% | 70% | ... |
| MID009 | NEWLY ADDED ITEM ENRICHED MODE | 0% | 0% | 0% | ... |
| MID010 | RECOVERY SKILL ITEM ENRICHED MODE | 0% | 0% | 0% | ... |
| MID011 | WHOLE ATTACK SKILL ITEM ENRICHED MODE | 50% | 0% | 70% | ... |
| MID012 | EVOLVABLE ITEM ENRICHED MODE | 0% | 0% | 0% | ... |
| MID013 | EVOLUTION MATERIAL ITEM ENRICHED MODE | 0% | 0% | 70% | ... |
| ⋮ | ⋮ | | | | |

SERVER DEVICE, CONTROL METHOD PERFORMED BY THE SERVER DEVICE, PROGRAM, AND TERMINAL DEVICE

CROSS REFERENCE TO RELATED APPLICATION

This application claims the priority of Japanese Patent Application No. 2013-070196, filed Mar. 28, 2013, which is incorporated herein by reference in its entirety.

BACKGROUND

Disclosed herein are a server device, a control method performed by the server device, a program, and a terminal device.

Conventionally, there are many techniques related to a server device which provides a game in which a user plays a match-type battle or completes a quest using the items he/she owns. For example, JP2008-220984A discloses a game server which comprises: image data storing means which stores image data for displaying game images, message data storing means which stores message data for displaying messages including rules, and control means which outputs a rule message, before a game starts, in a manner perceivable by a game player, displays on a display device a game image corresponding to the rule message on the basis of the image data and, after the game starts, displays on the display device a game image related to the game on the basis of the image data.

SUMMARY

With conventional techniques as in the game server of JP2008-220984A, the ways of acquiring battle cards are limited, leading to degradation of the user's interest in the game. As it is particularly difficult to acquire highly rare items, the user may have an impression that there is no chance of acquiring such an item, in which case the user's interest in the game will decrease considerably.

In view of the foregoing, an object of various embodiments of the present invention is to provide a server device which enables an item to be provided by a lottery and allows the item odds to be changed in accordance with a prescribed condition, and also to provide a control method performed by the server device, a program, and a terminal device.

A method according to the invention comprises a control method performed by a server device which is connected via a communication line to a terminal device operated by a user. The control method may comprise: the step of selecting a lottery mode from among a plurality of lottery modes; the step of, following the selection of the lottery mode, holding a drawing from among a plurality of types of items on the basis of the selected lottery mode; and the step of, following the holding of the drawing, providing the won item to the terminal device.

In the above-described lottery mode, the odds of winning a prescribed type of item among the plurality of types of items may be increased.

The control method may further include the step of storing the item acquired by the user, wherein in the lottery mode, the odds of winning an item that the user has not acquired yet among the plurality of types of items may be increased.

The above-described step of selecting a lottery mode may include a step of holding a lottery to select a lottery mode from among the plurality of lottery modes.

The control method may further include the step of storing user information associating the user with at least one of level, game progress, acquired items, and playing time, wherein in the step of holding a lottery to select a lottery mode, the lottery mode selected in the lottery may be varied in accordance with the user information.

A server device according to the invention comprises a server device which is connected via a communication line to a terminal device operated by a user. The server device may include: a lottery mode selecting unit which selects a lottery mode from among a plurality of lottery modes; a lottery unit which is operable, in response to the selection of the lottery mode, to hold a drawing from among a plurality of types of items on the basis of the selected lottery mode; and a providing unit which is operable, in response to the holding of the drawing, to provide the won item to the terminal device.

A terminal device according to the invention comprises a terminal device which is operated by a user and connectable to a server device via a communication line. The terminal device includes a processor which may perform the steps of: receiving, from the server device, a lottery mode selected from among a plurality of lottery modes; displaying the received lottery mode on a display; displaying a presentation of holding a drawing from among a plurality of types of items on the basis of the received lottery mode; and displaying the item won in the drawing on the display.

A system according to the invention comprises a system which includes a terminal device operated by a user and a server device connected to the terminal device via a communication line. The system may include: a lottery mode selecting unit which selects a lottery mode from among a plurality of lottery modes; a lottery unit which is operable, in response to the selection of the lottery mode, to hold a drawing from among a plurality of types of items on the basis of the selected lottery mode; and a providing unit which is operable, in response to the holding of the drawing, to provide the won item to the terminal device.

A server device according to the invention comprises a server device which is connected via a communication line to a terminal device operated by a user. The server device may include: means for selecting a lottery mode from among a plurality of lottery modes; means operable, in response to the selection of the lottery mode, for holding a drawing from among a plurality of types of items on the basis of the selected lottery mode; and means operable, in response to the holding of the drawing, for providing the won item to the terminal device.

A storage medium according to the invention comprises a computer-readable storage medium having recorded therein a process for causing a computer to perform steps which may include: the step of getting connected via a communication line to a terminal device operated by a user; the step of selecting a lottery mode from among a plurality of lottery modes; the step of, following the selection of the lottery mode, holding a drawing from among a plurality of types of items on the basis of the selected lottery mode; and the step of, following the holding of the drawing, providing the won item to the terminal device.

The program of the invention may be installed or loaded to a computer by downloading it from a recording medium, such as an optical disk like a CD-ROM, a magnetic disk, or a semiconductor memory, or downloading it through a communication network.

In the specification, the "unit" does not solely mean a physical structure. It also includes the case where a function of the structure is implemented by software. Further, a function of a structure may be implemented by two or more physical structures, or functions of two or more structures may be implemented by a single physical structure.

With the control method according to the invention, which is performed by a server device connected via a communication line to a terminal device operated by a user and which includes the step of selecting a lottery mode from among a plurality of lottery modes, the step of following the selection of the lottery mode, holding a drawing from among a plurality of types of items on the basis of the selected lottery mode, and the step of following the holding of the drawing, providing the won item to the terminal device, it becomes possible to provide an item by a lottery and change the item odds in accordance with a prescribed condition.

BRIEF DESCRIPTION OF THE DRAWINGS

FIG. 3 shows an item information table in the first embodiment;

FIG. 4 shows a user information table in the first embodiment;

FIG. 5 shows a mode information table in the first embodiment;

DETAILED DESCRIPTION

A first embodiment of the invention will be described below with reference to FIGS. 1 to 10.

Figure 1:
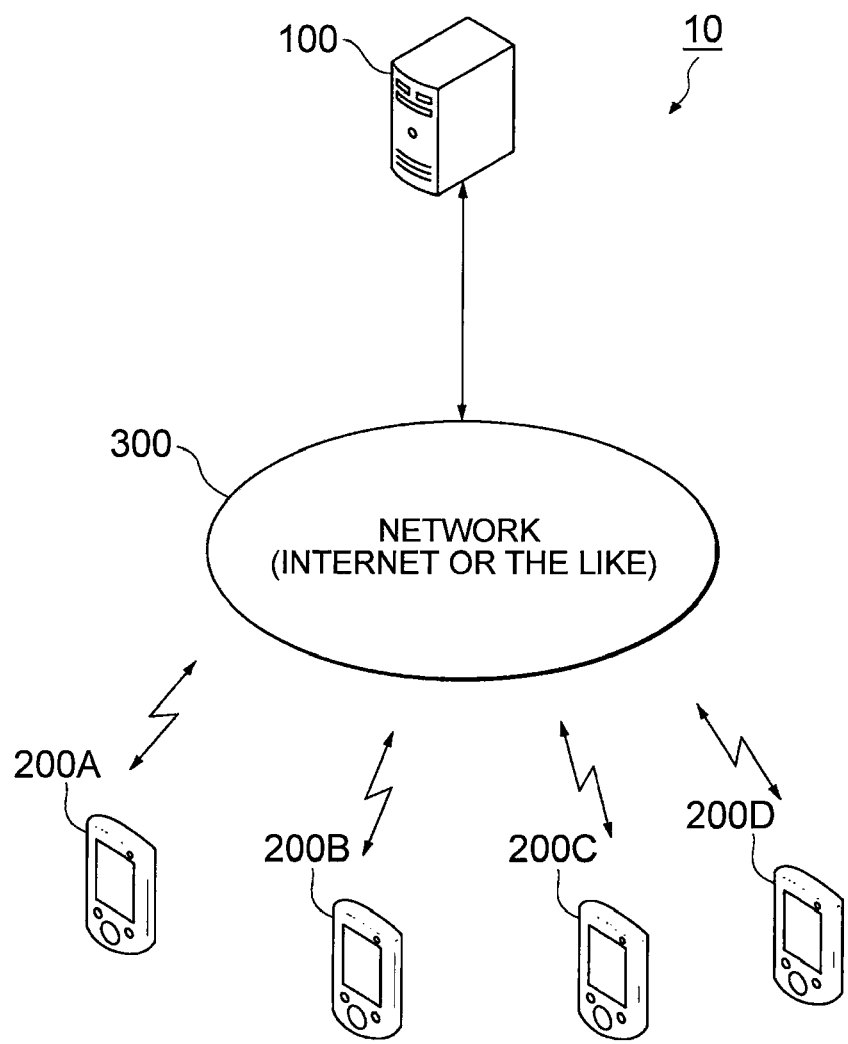
FIG. 1 is a configuration diagram of a game system including a server device according to a first embodiment.

FIG. 1 is a system configuration diagram of a game system 10 including a server device 100 according to the embodiment. As shown in FIG. 1, the server device 100 is a server computer connected to a network 300 such as the Internet or a dedicated line. Besides the server device 100, terminal devices, i.e. mobile terminals 200A to 200D (hereinafter, the mobile terminals 200A to 200D will be collectively referred to as "mobile terminal(s) 200"), are connected to the network 300 in a wired or wireless manner. The server device 100 and the mobile terminals 200, which are made communicable with each other, constitute the game system 10.

The game system 10 will be outlined first.

A user of this game system 10 uses a mobile terminal 200, connected to the network 300, to get connected to the server device 100, to thereby receive a game provided. The user who has been connected to the server device 100 can draw lots to acquire, from the server device 100, items necessary for the progress of the game.

The mobile terminal 200 is an information processing device having the function of communicating with the server device 100 via the network 300. Specifically, the mobile terminal 200 may be a mobile phone, smart phone, notebook PC, PDA, or the like. Although not shown in FIG. 1, the mobile terminal 200 preferably comprises a main control unit including a CPU and memory, a communication unit for connecting the terminal to the network 300, an input unit such as a touch panel for accepting user operations, and a display unit which displays an item lottery result. Although the terminal used by a user to access the server device 100 is the mobile terminal 200 in the embodiment, not limited thereto, it may be a desktop PC or other terminal device which is not portable, for example.

There are a plurality of types of items the user can acquire using the mobile terminal 200. They may include, for example: skill-improving items, which increase or improve attack power, defense power, or hit points of a player manipulated by the user when the player fights with an enemy character in the game; recovery items, which restore the player's hit points; attack items, which are used to attack an enemy character; and defense items, which are used to defend the player against an attack from an enemy character. As used herein, the "skill" means the ability to do a specific action such as attack, defense, recovery, or special attack.

It is desirable that the attack and defense items each have, as a parameter, an attribute such as fire, water, or thunder indicating chemistry with an enemy character. For example, it may be configured such that an attack item having the water attribute can be used as an effective attacking tool against the enemy character having the fire attribute. In addition to the attribute, other parameters such as attack power, defense power, hit points, rarity, etc. may be set for each item. For example, the rarity is desirably ranked in accordance with the rarity value of the item. The odds of winning each item in a lottery (hereinafter, referred to as "item odds") vary among patterns (described later) which associate respective items with item odds. The state in which an item lottery is held in a prescribed pattern is called a "mode".

Figure 2:
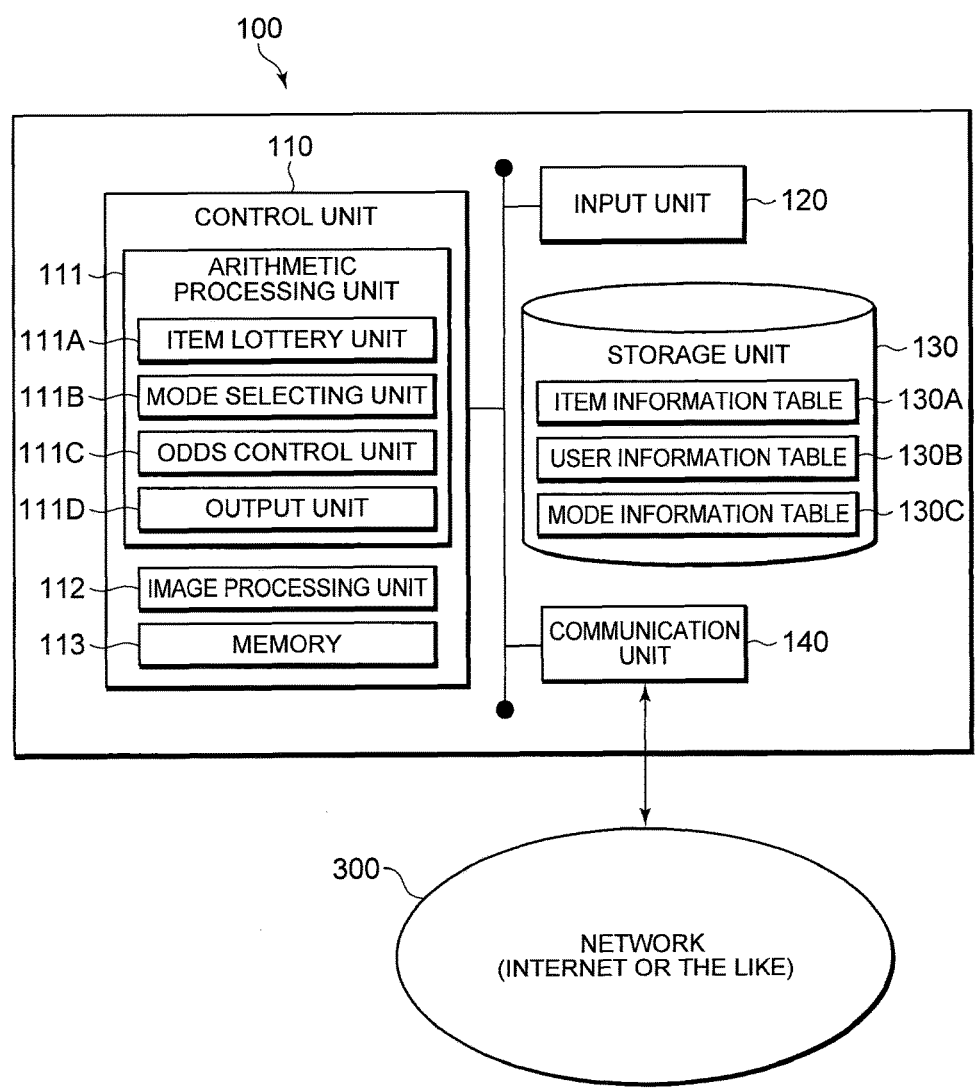
FIG. 2 is a block diagram of the server device in the first embodiment.

The configuration of the server device 100 will now be described with reference to FIG. 2. FIG. 2 is a block diagram of the server device 100. As shown in FIG. 2, the server device 100 comprises a control unit 110, an input unit 120, a storage unit 130, and a communication unit 140.

The control unit 110 comprises an arithmetic processing unit 111 such as a CPU or MPU, an image processing unit 112, and a memory 113 such as a RAM. The arithmetic processing unit 111 executes a program recorded in the storage unit 130, on the basis of inputs, to cause the functional units to operate. The program may be stored in a storage medium such as a CD-ROM, or distributed via the network 300, and installed into the computer. The memory 113 temporarily stores a server program, a game program, and various kinds of data necessary for computation during execution of the processing in the programs.

The image processing unit 112 generates images to be transmitted to the user mobile terminal 200. The images generated by the image processing unit 112 specifically include an image of an item, an image of an item lottery screen, and an image of a mode lottery screen.

The input unit 120 comprises a keyboard, mouse, touch panel, and the like. The input unit 120 accepts operations input by an administrator of the server device 100.

The storage unit 130 is configured with a storage device such as a hard disk. The storage unit 130 has recorded therein programs necessary for execution of processing in the control unit 110, and data necessary for execution of the programs. Specifically, it is desirable that the storage unit 130 has an item information table 130A, a user information table 130B, and a mode information table 130C. FIG. 3 shows an item information table 130A, and FIG. 4 shows a user information table 130B. For example, the item information table 130A stores, for each item, an item identifier, an item name, parameters (attribute, hit points, attack power, defense power, rarity, etc.), and an item added timing (the time when the item has become available in the game). The user information table 130B stores, for each user, user information including a user ID, a password, the user's game history (level, status, playing time, acquired items, mode information indicating a mode selection result), and probabilities that respective modes (described later) are selected (hereinafter, referred to as "mode selection probabilities"). Further, as shown in FIG. 5, the mode information table 130C stores mode identifiers and mode names of a plurality of types of modes, and item odds in the respective modes.

The communication unit 140 connects the server device 100 to the network 300. For example, the communication unit 140 may include a LAN card, analog modem, or ISDN modem, and an interface for connecting it to the processing unit via a system bus or other transmission path.

Further, as shown in FIG. 2, the arithmetic processing unit 111 has, as functional units, an item lottery unit 111A, a mode selecting unit 111B, an odds control unit 111C, and an output unit 111D.

The item lottery unit 111A holds a lottery to determine an item to be provided to a user from among a plurality of types of items. This lottery is desirably displayed in such a manner that the odds of winning an item can be controlled in accordance with the parameters of the item. For example, the lottery may be displayed using a capsule toy or the like in which a lever is rotated on the screen to eject an item, a roulette wheel, a lottery wheel or other lottery device, or a dart board. The image used for a lottery is generated by the image processing unit 112.

The mode selecting unit 111B selects, from among the modes stored in the mode information table 130C, a mode used for holding an item lottery.

Examples of the modes include a "non-duplicate mode", "parameter guarantee mode", and "variable odds mode". The "non-duplicate mode" refers to the mode in which any item already owned by the user is excluded from the lots so as to prevent the item from being won.

The "parameter guarantee mode" refers to the mode in which the probability that the item won in a lottery has a prescribed attribute is guaranteed to be 100%. The probability being 100% will be hereinafter expressed as being "guaranteed". Examples of the parameter guarantee modes include: a "fire attribute guarantee mode", "water attribute guarantee mode", and "thunder attribute guarantee mode" in each of which it is guaranteed that an item having a certain attribute is won; and a "skill-attached item guarantee mode" in which it is guaranteed that an item capable of exerting a specific ability, such as special attack or recovery, is won.

The "variable odds mode" refers to the mode in which the odds of winning a specific item are increased compared to the odds in a normal mode. Examples of the variable odds modes include: a "newly added item enriched mode" in which the odds of winning an item newly added to the game are increased, and a "skill-attached item enriched mode" in which the odds of winning an item with a prescribed skill are increased.

The information stored in the mode information table 130C for the respective modes will now be described. As explained above, each record in the mode information table 130C stores a mode identifier, a mode name, and item odds for respective items in the mode. For example, in the record for the "non-duplicate mode", values indicating the odds of winning respective items when the user does not have the corresponding items yet are stored as the item odds. These odds of winning items when the user does not have the corresponding items yet may be the same values as those in a normal mode.

In each of the records for the "parameter guarantee modes", a prescribed value is stored as the item odds for any item having the parameter the winning of which is guaranteed in that mode, and "0" is stored as the item odds for the other items. For example, in the record for the "fire attribute guarantee mode", a prescribed value is stored as the item odds for any item having the fire attribute, and "0" is stored as the item odds for any item having an attribute other than the fire attribute.

Further, in each of the records for the "variable odds modes", a value higher than that in the normal mode is stored as the item odds for any item having a specific parameter for each mode. For example, it may be configured such that, in the record for the "newly added item enriched mode", a value twice as large as that in the normal mode is stored as the item odds for any item that has been newly added, and the same values as those in the normal mode are stored as the item odds for the other items.

Figure 6:
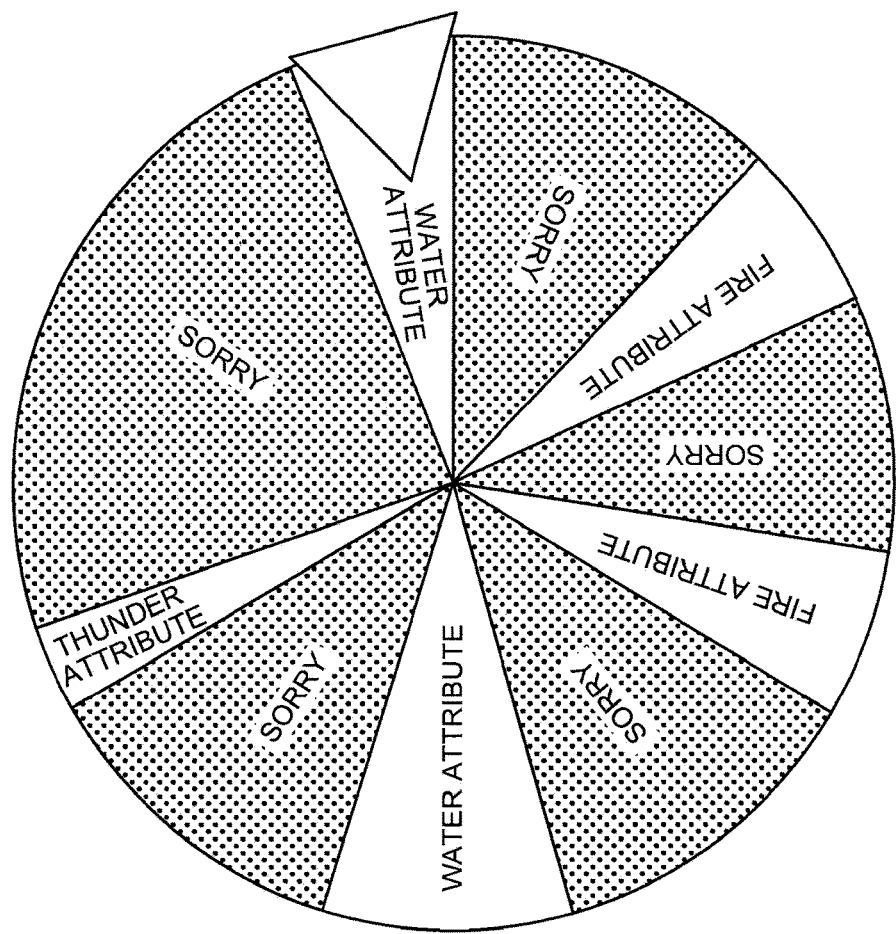
FIG. 6 shows an exemplary mode lottery screen in the first embodiment.

One of these modes is desirably selected by a lottery. The mode lottery can be held in various manners, as in the case of the item lottery. FIG. 6 shows an exemplary mode lottery screen. In this example, a lot is drawn for a mode in a roulette type lottery, from among "blank (normal mode)", "fire attribute guarantee mode", "water attribute guarantee mode", and "thunder attribute guarantee mode". It should be noted that the number of modes from which one mode is selected by a lottery, and the types and combination of the modes are not limited to those shown in this example.

It is also desirable that the mode selecting unit 111B controls the mode selection probabilities on the basis of the user information of respective users stored in the user information table 130B. For example, it may be configured such that, upon mode selection, the probability that "blank (normal mode)" is selected is lowered as the user level is higher. It may also be configured such that, in accordance with the progress of the game, for example in a stage where a large number of enemy characters having the fire attribute appear, the probability that the water attribute guarantee mode is selected is increased. Furthermore, the mode selection probability of a prescribed mode may be varied in accordance with the items owned by a user. For example, in the case where the user possesses a prescribed number or more of recovery items, the probability that the attack skill card enriched mode is selected may be increased. As such, the mode selecting unit 111B desirably controls the mode selection probabilities of the respective modes so as to compensate for the user's weak points. More specifically, it is desirable that the mode selecting unit 111B changes the mode selection probabilities for a user, which are stored in the user information table 130B, as appropriate, depending on the information such as the user's playing time, level, and acquired items, and selects a mode on the basis of the mode selection probabilities thus changed.

The odds control unit 111C refers to the mode information table 130C, on the basis of the mode selected by the mode selecting unit 111B, to control the item odds. More specifically, the odds control unit 111C may pass the item odds stored in the mode information table 130C, as arguments, to a subsequent processing stage. For example, in the mode information table 130C, for each of the above-described parameter guarantee modes, a prescribed value is stored as the item odds for any item having the parameter the winning of which is guaranteed in the selected mode, and "0" is stored as the item odds for any item not having the parameter the winning of which is guaranteed. The odds control unit 111C may pass the stored item odds, as arguments, to the item lottery unit 111A in the subsequent stage. Further, in the non-duplicate mode, the odds control unit 111C checks the items acquired by the user, which are recorded in the user information table 130B, sets "0" as the item odds for any item already owned by the user, and passes the item odds ("0"), as an argument, to the item lottery unit 111A. As for any item not yet owned by the user, the odds control unit 111C passes the value of the item odds stored in the mode information table 130C, as an argument, to the item lottery unit 111A. Further, in each of the variable odds modes, the odds control unit 111C desirably passes the item odds stored in the mode information table 130C, as arguments, to the item lottery unit 111A.

The output unit 111D outputs an image generated by the image processing unit 112. The output unit 111D may output image information to the mobile terminal 200 to cause the image to be displayed on the screen of the mobile terminal 200. Alternatively, in the case where the server device 100 is directly connected to a display, the output unit 110D may cause the image to be displayed on the display.

Figure 7:
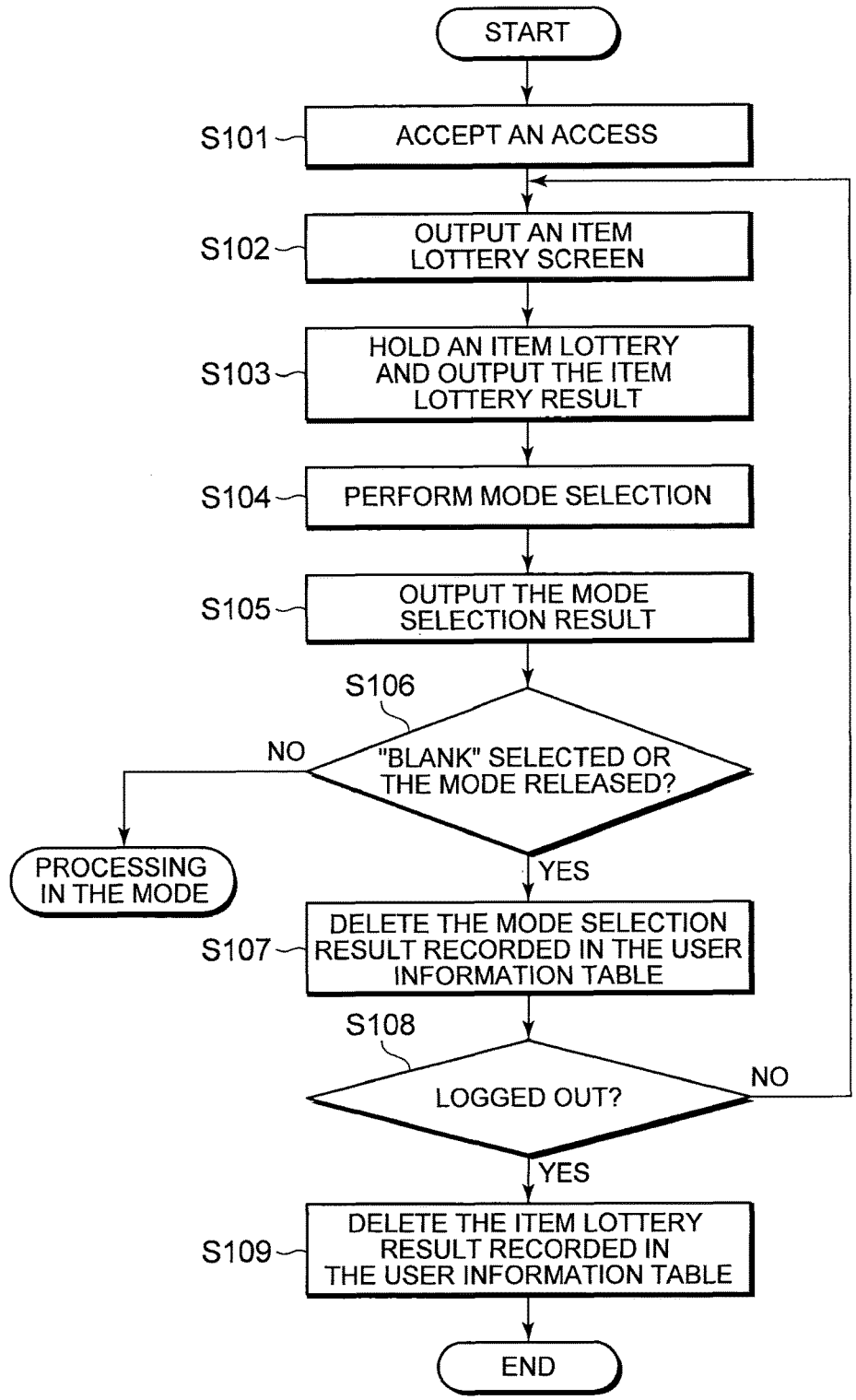
FIG. 7 is a chart illustrating the process flow of the server device in the first embodiment.
Figure 8:
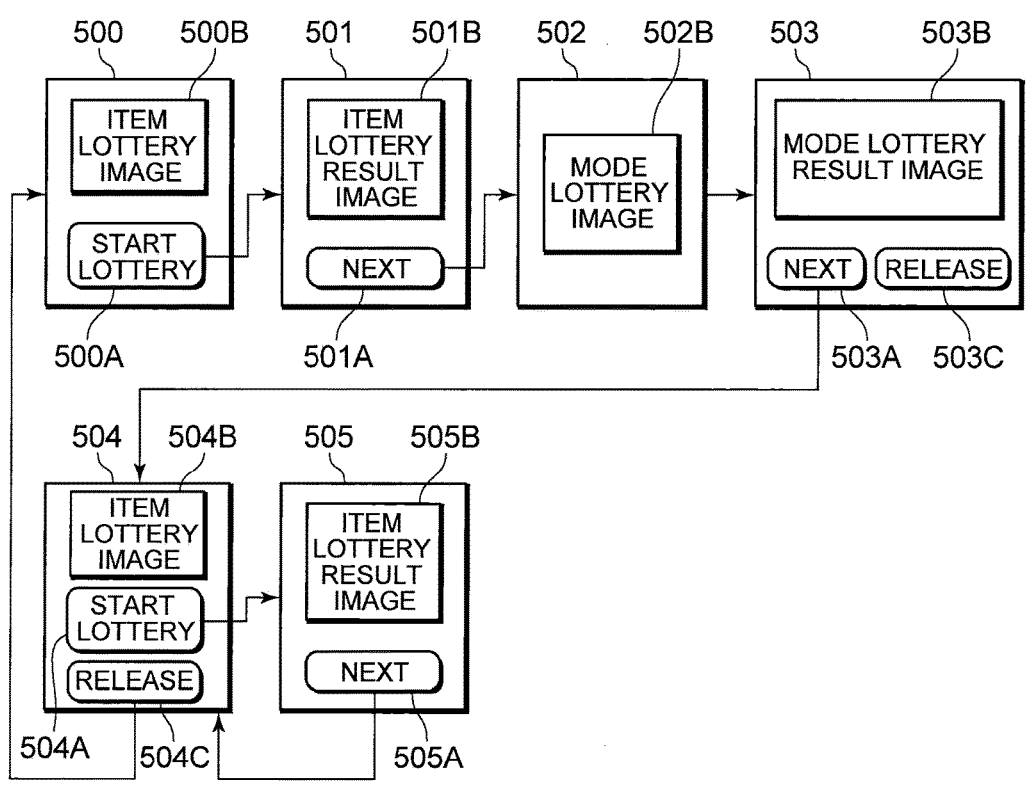
FIG. 8 illustrates screen transitions in the first embodiment.

The process flow in the arithmetic processing unit when a user uses the game system 10 to draw a lot for an item will now be described in detail with reference to FIGS. 7 and 8. FIG. 7 is a chart illustrating the process flow in the server device 100, and FIG. 8 shows transitions of screens displayed on the mobile terminal 200 in the course of the process flow. It should be noted that the process steps included in the process flow described below may be performed in a different order or in parallel, or another step may be added between the process steps, as long as no inconsistency arises in the processing content. Further, the step described as one step for convenience sake may be performed in two or more steps. The steps described as a plurality of steps for convenience sake may be understood as one step.

First, the server device 100 accepts an access from a user using a mobile terminal 200 (S101). At this time, a game start request is transmitted from the mobile terminal 200 to the arithmetic processing unit 111. It is desirable that the server device 100 requests an input of login information such as a user ID and password before starting the game. With this configuration, when the arithmetic processing unit 111 in the server device 100 recognizes the login information, the arithmetic processing unit 111 can obtain the user's history information linked to the user ID, from the user information table 130B in the storage unit 130, so that the game can be restarted from the last interruption.

When the server device 100 receives a game start request from a user, the image processing unit 112 generates an item lottery screen (screen 500 in FIG. 8). The output unit 111D outputs this screen to the mobile terminal 200 of the user (S102). On the item lottery screen 500, as shown in FIG. 8, a lottery start button 500A for starting an item lottery and a lottery image 500B displaying a roulette or other lottery device are displayed.

When the user selects the lottery start button 500A by clicking on or touching the button on the item lottery screen 500, an item lottery is started. The result of the item lottery is displayed on an item lottery result display screen (screen 501 in FIG. 8) (S103). It is desirable that, while the user is logged in, each time a lottery is held, the arithmetic processing unit 111 adds the item lottery result, as an acquired item, to the user information table 130B.

On the item lottery result display screen 501, as shown in FIG. 8, an image 501B of the item acquired by the user by the lottery and a "Next" button 501A for selecting a mode by a lottery are displayed. When the user uses this screen to operate the mobile terminal 200 to select the "Next" button 501A, mode selection by a lottery is started (S104). The mode selection is performed on a mode lottery screen 502 in FIG. 8. The result of the mode selection is recorded, as a mode selection result (called "mode information"), in the user information table 130B by the arithmetic processing unit 111. The mode information is kept while the mode is continued.

The result of the mode selection is displayed on a mode result display screen 503 in FIG. 8 (S105). On this screen, a mode lottery result image 503B showing the selected mode, a "Next" button 503A for proceeding to a next item lottery, and a release button 503C for releasing the mode are displayed. When the user has selected the release button 503C, or when the result of the mode selection was "blank (normal mode)", the arithmetic processing unit 111 determines that the mode has been released (YES in S106), and the mode returns to the normal mode. At this time, the mode information that has been kept in the user information table 130B is deleted (S107), and the screen returns to the item lottery screen 500.

On the other hand, when the mode selection result was not "blank" and the user has selected the "Next" button 503A (NO in S106), an item lottery screen 504 shown in FIG. 8 is displayed in accordance with the selected mode, while the state where the item odds are controlled by odds control processing (described later) is being maintained. On the item lottery screen 504, a lottery start button 504A for instructing to hold a lottery in accordance with the selected mode, a lottery image 504B displaying a roulette or other lottery device, and a release button 504C for releasing the selected mode are displayed. When the user selects the lottery start button 504A, an item lottery corresponding to the mode is held. The result of the lottery held in the state where the mode is being maintained is displayed on an item lottery result screen 505 in FIG. 8. When the user selects a "Next" button 505A displayed on this screen, the item lottery screen 504 is displayed again, and a lottery is held with the selected mode maintained.

On the other hand, when the user has selected the release button 504C on the item lottery screen 504, the arithmetic processing unit 111 determines that the mode has been released (YES in S106), and the mode returns to the normal mode. At this time, the mode information that has been kept in the user information table 130B is deleted, and the screen returns to the item lottery screen 500. Further, when the arithmetic processing unit 111 determines that the user has logged out (YES in S108), the arithmetic processing unit 111 deletes the information about the acquired items (in other words, history information of the item lottery results) recorded in the user information table 130B (S109), and terminates the process.

Odds control processing carried out when a lottery is held in the state where a specific mode has been selected will now be described with reference to FIGS. 9 and 10.

Figure 9:
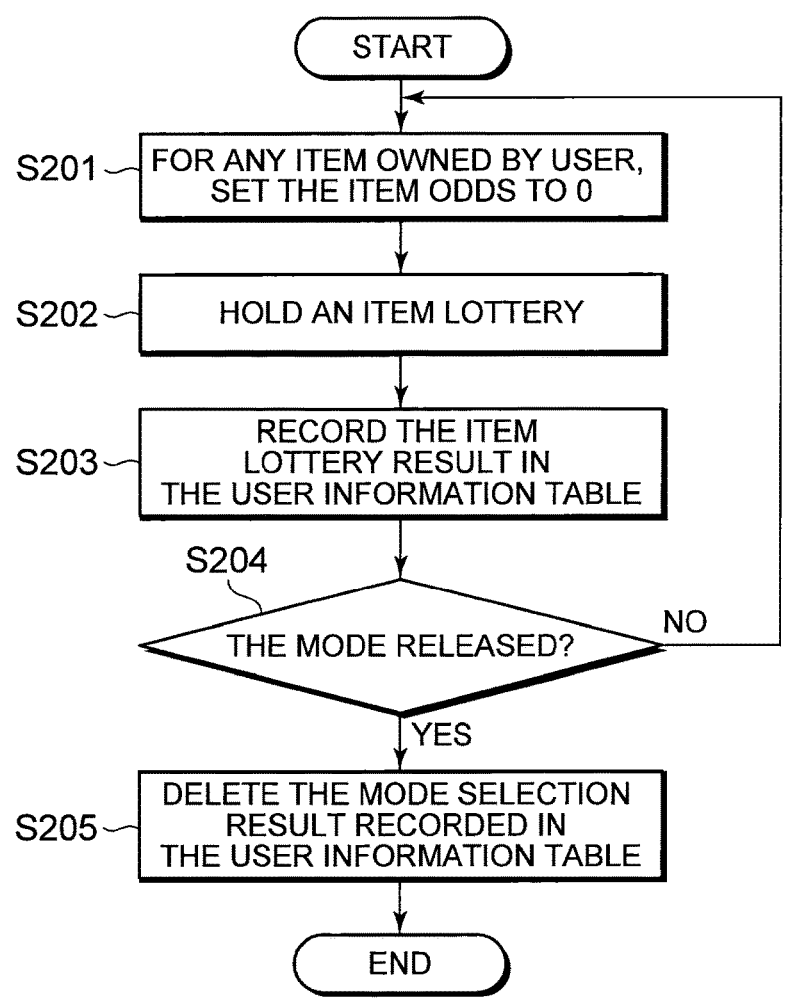
FIG. 9 is a chart illustrating the process flow of odds control processing in the first embodiment.

FIG. 9 is a flowchart illustrating the process flow in the "non-duplicate mode". When the non-duplicate mode has been selected in a lottery, the odds control unit 111C refers to the acquired items listed in the user information table 130B to check the items the user has acquired during the logged-in period. The odds control unit 111C then sets the item odds for any item already owned by the user to "0" (S201), and passes the odds ("0"), as an argument, to the item lottery unit 111A. As for the items not owned by the user, the odds control unit 111C passes the item odds stored in the mode information table 130C as they are, as arguments, to the item lottery unit 111A. Next, the item lottery unit 111A holds a lottery on the basis of the item odds received from the odds control unit 111C (S202). The arithmetic processing unit 111 adds the item acquired by the user in the item lottery, as an acquired item, to the user information table 130B as appropriate (S203). The processing in S201 through S203 is repeated until the user releases the mode. When the arithmetic processing unit 111 determines that the mode has been released (YES in S204), the arithmetic processing unit 111 deletes the mode information recorded in the user information table 130B (S205), and terminates the non-duplicate mode.

Figure 10:
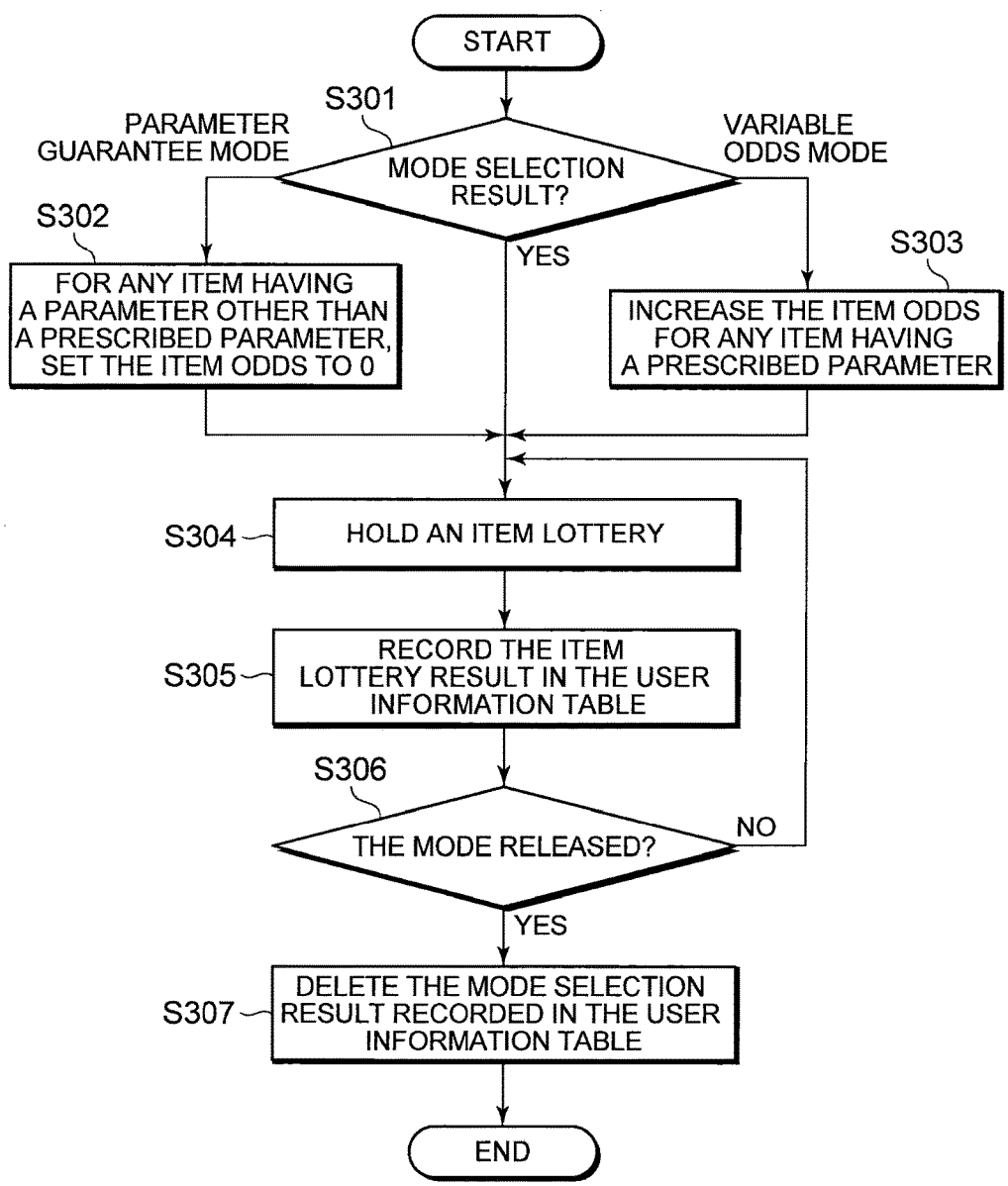
FIG. 10 is another chart illustrating the process flow of the odds control processing in the first embodiment.

FIG. 10 is a flowchart illustrating the process flow in the "parameter guarantee mode" and "variable odds mode". First, the odds control unit 111C refers to the user information table 130B to determine the selected mode (S301). If the odds control unit 111C determines that the current mode is the "parameter guarantee mode", the odds control unit 111C refers to the mode information table 130C and passes the item odds for each item, as an argument, to the item lottery unit 111A (S302). In the mode information table 130C, "0" is stored as the item odds for any item that does not have the parameter the winning of which is guaranteed, and a prescribed value is stored as the item odds for any item that has the parameter the winning of which is guaranteed. For example, in the case where the current mode is the water attribute guarantee mode, "0" is passed to the item lottery unit 111A as the item odds for any item having an attribute other than the water attribute.

If the odds control unit 111C determines that the selected mode is the "variable odds mode", the odds control unit 111C increases the item odds for any item with a prescribed parameter, to a prescribed value (S303). For example, in the case where the selected mode is the "newly added item enriched mode", the odds control unit 111C increases the item odds for any item that has been newly added to the game.

Each time the item lottery unit 111A holds a lottery on the basis of the received arguments (item odds) (S304), the arithmetic processing unit 111 adds the lottery result to the user information table 130B (S305). The processing in S304 and S305 is repeated until the user releases the mode. When the arithmetic processing unit 111 determines that the mode has been released (YES in S306), the odds control unit 111C resets any changed item odds to a normal value. The arithmetic processing unit 111 deletes the mode information recorded in the user information table 130B (S307), and terminates the mode.

Other Embodiments

While an embodiment of the invention has been described above, the invention is not limited to the above embodiment; various modifications and changes are possible on the basis of the technical ideas of the invention.

For example, in the above embodiment, the mobile terminal 200 is configured to directly access the server device 100 via the network 300. Alternatively, for example in the case where the communication system has a Web server, it may be configured such that the Web server relays the communications between the server device 100 and the mobile terminal 200. This can reduce the security risks.

Further, in the above embodiment, the mode selecting unit 111B is configured to determine a mode by a lottery. However, not limited thereto, the mode may be determined in accordance with the progress of the game of a user, for example, or it may be configured to allow a user to select a mode arbitrarily. Although it has been described above that the mode selecting unit 111B selects a mode used for an item lottery from among the modes stored in the storage unit 130, the modes do not necessarily have to be stored. For example, branch conditions for the processing carried out by the odds control unit 111C for controlling the odds may be utilized.

DESCRIPTION OF REFERENCE NUMERALS

10: game system
100: server device
110: control unit
111: arithmetic processing unit
111A: item lottery unit
111B: mode selecting unit
111C: odds control unit
111D: output unit
112: image processing unit
113: memory
120: input unit
130: storage unit
130A: item information table
130B: user information table
130C: mode information table
140: communication unit
200A to 200D: mobile terminal
300: network
500 to 505: screen
500A to 505A: button
503C, 504C: button
500B to 505B: image

What is claimed is:

1. A control method performed by a server device, the server device connected via a network to a plurality of mobile terminal devices each configured to communicate with the server device and configured to implement a lottery system for enhancing interest of a user in a game, the method comprising:

storing, in a storage unit, a plurality of lottery modes, wherein each of the plurality of lottery modes associates respective items, which are providable to the user, with item odds;

receiving a start request for a game from a mobile terminal device in the plurality of mobile terminal devices;

transmitting an image indicating the plurality of lottery modes to the mobile terminal device;

selecting, with a mode selecting unit, a lottery mode from among the plurality of lottery modes based on one or more mode selection probabilities, wherein the one or more mode selection probabilities are adjustable in size based on one or more predetermined actions of the user;

transmitting an image indicating the selected lottery mode;

receiving a mode selection request, on the mode selecting unit, from the mobile terminal device, the mode selection request comprising one of a release command or a continue command, and, when the release command is received, changing the selected lottery mode to another lottery mode from among the plurality of lottery modes such that the another lottery mode becomes the selected lottery mode;

holding a drawing from among a plurality of types of the items on the basis of the selected lottery mode;

transmitting an image indicating a won item in the drawing to the mobile terminal device,
wherein the won item is usable in the game for which the start request was received.

2. The control method according to claim 1, further comprising:
increasing, on the basis of the selected lottery mode, the odds of winning a prescribed type of item among the plurality of types of items.

3. The control method according to claim 1, further comprising:
storing the won item in the storage unit; and
increasing, on the basis of the selected lottery mode, the odds of winning an item that the user has not acquired yet among the plurality of types of items.

4. The control method according to claim 1, wherein selecting a lottery mode includes holding a lottery to select a lottery mode from among the plurality of lottery modes on the basis of mode selection probabilities.

5. The control method according to claim 4, further comprising:
storing user information associating the user with at least one of level, game progress, acquired items, and playing time in the storage unit; and
varying the mode selection probabilities in accordance with the user information.

6. The control method of claim 1, wherein the plurality of lottery modes comprises a normal lottery mode and at least one variable odds lottery mode, and wherein the transmitted image indicating the plurality of lottery modes comprises a lottery mode summary displaying a menu providing a limited list of data associated with each lottery mode, the limited list of data comprising an identification of each lottery mode as a normal lottery mode or as an variable odds lottery mode, the menu allowing each of the lottery modes to be reached directly upon being selected.

7. The control method of claim 1, further comprising transmitting at least one image depicting the selection of the lottery mode from among the plurality of lottery modes, the at least one image displaying a visual representation of a probability of randomly selecting each of the lottery modes in the plurality of lottery modes, the at least one image further displaying a visual representation of an adjustment in mode selection probabilities made in accordance with stored user information.

8. The control method of claim 1, wherein the start request for the game further comprises login information, the login information being associated with a user history in a user information table, and further comprising:
retrieving user information from the user history and varying mode selection probabilities in accordance with the user information.

9. A server device connected via a communication line to a mobile terminal device operated by a user and configured to implement a lottery system for enhancing interest of a user in a game, the server device comprising:
a storage unit that stores a plurality of lottery modes, wherein each of the plurality of lottery modes associates respective items, which are providable to the user, with item odds;
a lottery mode selecting unit that selects a lottery mode from among the plurality of lottery modes based on one or more mode selection probabilities, wherein the one or more mode selection probabilities are adjustable in size based on one or more predetermined actions of the user;
a lottery unit that holds a drawing from among a plurality of types of the items on the basis of the selected lottery mode;
a communication unit that
receives a start request for a game from the mobile terminal device;
transmits an image indicating the plurality of lottery modes to the mobile terminal device;
transmits an image indicating the selected lottery mode to the mobile terminal device;
receives a mode selection request from the mobile terminal device, the mode selection request comprising one of a release command or a continue command, the communication unit further being configured to, when the release command is received, trigger the lottery mode selecting unit to change the selected lottery mode to another lottery mode from among the plurality of lottery modes such that the another lottery mode becomes the selected lottery mode;
transmits an image indicating a won item in the drawing to the mobile terminal device,
wherein the won item is usable in the game for which the start request was received.

10. A mobile terminal device operated by a user and connectable to a server device configured to implement a lottery system for enhancing interest of a user in a game via a communication line, the mobile terminal device comprising a processor performing:
transmitting a start request for the game to the server device;
receiving, from the server device, an image indicating a plurality of lottery modes, wherein each of the plurality of lottery modes associates respective items, which are providable to the user, with item odds, each of the plurality of lottery modes associated with one or more mode selection probabilities, wherein said one or more mode selection probabilities are adjustable in size based on one or more predetermined actions of the user;
receiving, from the server device, an image indicating a lottery mode selected from among the plurality of lottery modes;
displaying the image indicating the selected lottery mode on a display;
transmitting, to the server device, a mode selection request, the mode selection request comprising one of a release command or a continue command, the release command comprising an instruction to the server device to change the selected lottery mode to another lottery mode from among the plurality of lottery modes such that the another lottery mode becomes the selected lottery mode;
displaying a presentation of holding a drawing from among a plurality of types of items on the basis of the selected lottery mode on the display;
receiving, from the server device, an image indicating a won item in the drawing; and
displaying the won item on the display,
wherein the won item is usable in the game for which the start request was transmitted.

11. A system including a mobile terminal device operated by a user and a server device connected to the mobile terminal device via a communication line and configured to implement a lottery system for enhancing interest of a user in a game, the system comprising:

a storage unit that stores a plurality of lottery modes, wherein each of the plurality of lottery modes associates respective items, which are providable to the user, with item odds;
a lottery mode selecting unit that selects a lottery mode from among the plurality of lottery modes, wherein the selection of the lottery mode from among the plurality of lottery modes is based on one or more mode selection probabilities, wherein the one or more mode selection probabilities are adjustable in size based on one or more predetermined actions of the user;
a lottery unit that holds a drawing from among a plurality of types of the items on the basis of the selected lottery mode;
a communication unit that
receives a start request for the game from the mobile terminal device;
transmits an image indicating the plurality of lottery modes to the terminal device;
transmits an image indicating the selected lottery mode to the mobile terminal device;
receives a mode selection request from the mobile terminal device, the mode selection request comprising one of a release command or a continue command, the communication unit further being configured to, when the release command is received, trigger the lottery mode selecting unit to change the selected lottery mode to another lottery mode from among the plurality of lottery modes such that the another lottery mode becomes the selected lottery mode;
transmits an image indicating a won item in the drawing to the mobile terminal device,
wherein the won item is usable in the game for which the start request was received.

12. A server device connected via a communication line to a mobile terminal device operated by a user and configured to implement a lottery system for enhancing interest of a user in a game, the server device comprising:
means for storing a plurality of lottery modes, wherein each of the plurality of lottery modes associates respective items, which are providable to the user, with item odds;
means for selecting a lottery mode from among the plurality of lottery modes based on one or more mode selection probabilities, wherein the one or more mode selection probabilities are adjustable in size based on one or more predetermined actions of the user;
means for holding a drawing from among a plurality of types of the items on the basis of the selected lottery mode; and
means for
receiving a start request for the game from the mobile terminal device;
transmitting an image indicating the plurality of lottery modes to the mobile terminal device;
transmitting an image indicating the selected lottery mode to the mobile terminal device;
receiving a mode selection request from the mobile terminal device, the mode selection request comprising one of a release command or a continue command, the means for receiving the mode selection request further including a means for triggering a change in the selected lottery mode to another lottery mode from among the plurality of lottery modes such that the another lottery mode becomes the selected lottery mode;
transmitting an image indicating a won item in the drawing to the mobile terminal device,
wherein the won item is usable in the game for which the start request was received.

13. A non-transitory computer-readable storage medium having recorded therein a process for causing a computer to perform steps comprising implementing a lottery system for enhancing interest of a user in a game, the steps comprising:
storing, in a storage unit, a plurality of lottery modes, wherein each of the plurality of lottery modes associates respective items, which are providable to the user, with item odds;
getting connected via a communication line to a mobile terminal device operated by a user;
receiving a start request for the game from the mobile terminal device;
transmitting an image indicating the plurality of lottery modes to the mobile terminal device;
selecting a lottery mode from among the plurality of lottery modes based on one or more mode selection probabilities, wherein the one or more mode selection probabilities are adjustable in size based on one or more predetermined actions of the user;
transmitting the image indicating the selected lottery mode;
holding a drawing from among a plurality of types of the items on the basis of the selected lottery mode;
receiving a mode selection request from the mobile terminal device, the mode selection request comprising one of a release command or a continue command, the computer further being configured to perform the step of, when the release command is received, changing the selected lottery mode to another lottery mode from among the plurality of lottery modes such that the another lottery mode becomes the selected lottery mode; and
transmitting the image indicating a won item in the drawing to the mobile terminal device,
wherein the won item is usable in the game for which the start request was received.

14. A server that is communicatively linked to a mobile terminal via a network and configured to implement a lottery system for enhancing interest of a user in a game, wherein the server comprises:
a central processing unit that
selects a lottery mode from among a plurality of lottery modes based on one or more mode selection probabilities, wherein the one or more mode selection probabilities are adjustable in size based on one or more predetermined actions of the user, and wherein the plurality of lottery modes includes:
a non-duplicate mode, in which any item already owned by the user is excluded from the drawing,
a parameter guarantee mode, in which the probability of the item won in the drawing has a particular attribute is 100%; and
following the selection of the lottery mode, holds a drawing from among a plurality of types of items on the basis of the selected lottery mode;
an image processing unit that
generates an image comprising the plurality of lottery modes;
generates an image indicating the selected lottery mode; and generates an image indicating the item that was won as a result of the drawing; and a communication unit that receives a game start request from the mobile terminal, wherein the won item is usable in the game for which the start request was received;

transmits the image comprising the plurality of lottery modes to the mobile terminal;

transmits the image indicating the selected lottery to the mobile terminal; and receives a mode selection request from the mobile terminal, the mode selection request comprising one of a release command or a continue command, the communication unit further being configured to, when the release command is received, trigger the central processing unit to change the selected lottery mode to another lottery mode from among the plurality of lottery modes such that the another lottery mode becomes the selected lottery mode.

15. The server of claim 14, wherein the plurality of lottery modes further includes a variable odds mode, in which the odds of winning a specific item are increased compared to the odds in a normal mode.

16. A server that is communicatively linked to a mobile terminal device via a network and configured to implement a lottery system for enhancing interest of a user in a game, wherein the server carries out steps comprising:

receiving a game start request from the mobile terminal device;

generating an image of a player that is controllable by a user of the mobile terminal device, an image of an enemy character, and an image comprising a plurality of lottery modes;

transmitting, to the mobile terminal device, the image of the player, the image of the enemy character, and the image of the plurality of lottery modes;

selecting a lottery mode from among the plurality of lottery modes based on one or more mode selection probabilities, wherein the one or more mode selection probabilities are adjustable in size based on one or more predetermined actions of the user;

generating an image indicating the selected lottery mode;

transmitting the image of the selected lottery mode to the mobile terminal device;

based on the selected lottery mode, holding a drawing from among a plurality of types of items, in which each of the plurality items enhances the player in a fight against the enemy;

receiving a mode selection request from the mobile terminal device, the mode selection request comprising one of a release command or a continue command, and, when the release command is received, changing the selected lottery mode to another lottery mode from among the plurality of lottery modes such that the another lottery mode becomes the selected lottery mode;

generating an image indicating which item was won as a result of the drawing; and following the holding of the drawing, transmitting the image indicating the won item to the mobile terminal device.

17. The server of claim 16, wherein the won item is associated with an attribute indicating a chemistry with the enemy character.

18. The server of claim 16, wherein the won item confers attack power on the player with respect to the enemy character.

19. The server of claim 16, wherein the won item confers defense power on the player with respect to the enemy character.

20. The server of claim 16, wherein the won item confers hit points on the player.

* * * * *